United States Patent
Szor et al.

(10) Patent No.: US 7,617,534 B1
(45) Date of Patent: Nov. 10, 2009

(54) DETECTION OF SYSENTER/SYSCALL HIJACKING

(75) Inventors: Peter Szor, Northridge, CA (US); Peter Ferrie, Los Angeles, CA (US); Matthew Conover, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 763 days.

(21) Appl. No.: 11/213,289

(22) Filed: Aug. 26, 2005

(51) Int. Cl.
G06F 12/14 (2006.01)
G06F 11/00 (2006.01)

(52) U.S. Cl. .................... 726/22; 726/23; 726/24; 726/25; 726/30; 713/10; 713/188

(58) Field of Classification Search .............. 726/2, 726/22
See application file for complete search history.

(56) References Cited

U.S. PATENT DOCUMENTS

| | | | |
|---|---|---|---|
| 6,385,727 | B1 | 5/2002 | Cassagnol et al. |
| 6,438,666 | B2 | 8/2002 | Cassagnol et al. |
| 6,735,703 | B1 | 5/2004 | Kilpatrick et al. |
| 6,772,332 | B1 | 8/2004 | Boebert et al. |
| 6,823,433 | B1 | 11/2004 | Barnes et al. |
| 6,854,039 | B1 | 2/2005 | Strongin et al. |
| 6,988,226 | B2 | 1/2006 | Koning et al. |
| 7,007,301 | B2 | 2/2006 | Crosbie et al. |
| 7,152,242 | B2 * | 12/2006 | Douglas ............. 726/23 |
| 7,260,845 | B2 * | 8/2007 | Kedma et al. ......... 726/23 |
| 2002/0129245 | A1 | 9/2002 | Cassagnol et al. |
| 2003/0093686 | A1 | 5/2003 | Barnes et al. |
| 2003/0188169 | A1 | 10/2003 | Strongin et al. |
| 2003/0188178 | A1 | 10/2003 | Strongin et al. |
| 2003/0226014 | A1 | 12/2003 | Schmidt et al. |
| 2003/0226022 | A1 | 12/2003 | Schmidt et al. |
| 2005/0076186 | A1 | 4/2005 | Traut |
| 2005/0120236 | A1 | 6/2005 | Witmann |
| 2005/0204205 | A1 | 9/2005 | Ring et al. |
| 2005/0228990 | A1 | 10/2005 | Kato et al. |
| 2005/0229250 | A1 | 10/2005 | Ring et al. |
| 2008/0016314 | A1 * | 1/2008 | Li et al. ............. 711/200 |

OTHER PUBLICATIONS

Butler, J., et al, 'VICE-catch the hookers!', In Black Hat USA, Jul. 2004, entire document, http://www.blackhat.com/presentations/bh-usa-04/bh-us-04-butler/bh-us-04-butler.pdf.*

Butler, James, VICE—Catch the hookers! Black Hat, Las Vegas, Jul. 2004. www.blackhat.com/presentations/bh-usa-04/bh-us-04-butler/bh-us-04-butler.pdf.*

(Continued)

Primary Examiner—Edan Orgad
Assistant Examiner—Ronald Baum
(74) Attorney, Agent, or Firm—Fenwick & West LLP

(57) ABSTRACT

Techniques are disclosed for detecting manipulations of user-kernel transition registers (such as the SYSENTER/SYSCALL critical registers of Intel/AMD processors, respectively), and other such registers. In one embodiment, a register monitor agent is deployed at system boot-up, and continues monitoring target registers for manipulation during system use. If a manipulation is detected, then exclusions are checked to see if that manipulation is legitimate (e.g., caused by a trusted source). If not a legitimate manipulation, then reporting and/or corrective action can be taken. The techniques can be used in real-time and in any number of behavior blocking, antivirus, and/or intrusion prevention applications.

15 Claims, 4 Drawing Sheets

OTHER PUBLICATIONS

Keong, T.C., "SIG'G-TEC —Win2K Kernel Hidden Process/Module Checker 0.1 (Proof-Of-Concept)," May 23, 2004, [online] [Retrieved on May 15, 2006] Retrieved from the Internet<URL:http://www.security.org.sg/code/kproccheck.html>, 6 pages.

"Notes from "Windows NT System —Call Hooking" (Dr. Dobb's Journal, '97)," [online] [Retrieved on May 15, 2006] Retrieved from the Internet <URL:http://www.stanford.edu/~stinson/misc/curr_res/hooks/nt_hooking.txt>, 9 pages.

Rutkowska, J., "System Virginity Verifier: Defining the Roadmap for Malware Detection on Windows System," Hack In The Box Security Corporation, Sep. 28-29, 2005, Retrieved from the Internet<URL:http://www.invisiblethings.org/papers/hitb05_virginity_verifier.ppt>, 38 pages.

* cited by examiner

DETECTION OF SYSENTER/SYSCALL HIJACKING

FIELD OF THE INVENTION

The invention relates to malicious code detection, and more particularly, to detection of rootkit applications and exploits.

BACKGROUND OF THE INVENTION

With the release of high performance processors such as Intel Corporation's Pentium II and AMD's K7, modern operating systems can now take advantage of the performance gains with the use of the SYSENTER/SYSCALL/SYSEXIT/SYSRET instructions. These instructions use a set of internal registers in the processor, such as the SYSENTER_EIP register (e.g., Pentium II), which holds the code segment, stack pointer and the instruction pointer to use on entry to Ring 0 (Kernel mode) from Ring 3 (User mode subsystems). This user-kernel transition mechanism makes the operating system faster by making the ring transitions more efficient.

However, this mechanism is vulnerable to hijacking. In particular, there is a class of rootkit applications and exploit programs that manipulates with the critical registers of SYSENTER (Intel) and SYSCALL (AMD) instructions in order to take control over a computer system, and is able to monitor all system functions of user mode applications as they happen. These malicious programs do not need to alter any other structures in the target system's memory, or manipulate with the page table. Thus, their functionality is hidden from conventional intrusion detection programs, and therefore more difficult to notice on the system.

What is needed, therefore, are techniques for detecting manipulations of user-kernel transition registers (such as Intel's SYSENTER and AMD's SYSCALL registers) in order to detect potentially malicious or otherwise undesirable actions.

SUMMARY OF THE INVENTION

One embodiment of the present invention provides a method for detecting malicious or otherwise undesirable register manipulation in a computing system. The method includes changing a pointer value in a user-kernel transition register to point to a register monitor agent that will monitor the user-kernel transition register for manipulation, and verifying that the pointer value in the user-kernel transition register remains pointed to the register monitor agent. In response to determining that the pointer value in the user-kernel transition register has changed, the method includes determining if an exclusion applies because manipulation of the register was caused by a trusted source. In response to determining an exclusion does not apply, the method includes indicating that the computing system has been compromised. In response to determining an exclusion does apply, the method may include repeating the changing, verifying, and determining. At boot-up of the computing system, the method may include loading a kernel mode driver for initializing the computing system to carry out the method. Initializing the computing system may include, for example, reading a current pointer value of the user-kernel transition register, and verifying that the pointer value points to an acceptable location. In response to the user-kernel transition register not pointing to an acceptable location at boot-up, the method may include indicating that the computing system has been compromised. In response to determining an exclusion does not apply, the method may further include executing corrective action. In one such case, executing corrective action includes changing the pointer value of the user-kernel transition register to point back to the register monitor agent. In another such case, executing corrective action includes at least one of scanning the computing system, reporting a current state of the computing system, removing non-excluded code, and transmitting non-excluded code for analysis.

Another embodiment of the present invention provides a machine-readable medium (e.g., compact disk, diskette, server, or hard drive) encoded with instructions, that when executed by a processor, cause the processor to carry out a process for detecting malicious or otherwise undesirable register manipulation in a computing system. This process can be, for example, similar to or a variation of the previously described method.

Another embodiment of the present invention provides an apparatus for detecting malicious or otherwise undesirable register manipulation in a computing system. The system includes a register monitor-agent module for verifying that a pointer value in a user-kernel transition register remains pointed to the register monitor agent, and in response to determining that the pointer value has changed, for determining if an exclusion applies because manipulation of the register was caused by a trusted source. The apparatus also includes a kernel mode driver module that loads at boot-up of the computing system, for changing the pointer value in the user-kernel transition register to point to the register monitor agent. In one such case, the register monitor agent module is integrated into the kernel mode driver module. In response to determining an exclusion does not apply, the apparatus can be further configured to indicate that the computing system has been compromised. In another particular case, the register monitor agent is called whenever a processor of the computing system executes a SYSCALL/SYSENTER instruction. Prior to changing the pointer value in the user-kernel transition register to point to the register monitor agent, the kernel mode driver module can be further configured for initializing the apparatus. This initialization may include, for example, reading a current pointer value of the user-kernel transition register, verifying that the pointer value points to an acceptable location, and in response to the user-kernel transition register not pointing to an acceptable location at boot-up, indicating that the computing system has been compromised. In response to determining an exclusion does apply, the register monitor agent module can be configured for changing the pointer value in the user-kernel transition register to point back to the register monitor agent and to continue monitoring the user-kernel transition register, and in response to determining an exclusion does not apply, the register monitor agent module can be configured for executing corrective action. Executing corrective action may include, for instance, changing the pointer value of the user-kernel transition register to point back to the register monitor agent. The register monitor agent module and kernel mode driver module can be implemented, for example, in software (e.g., executable instructions encoded on a computer-readable medium), hardware (e.g., gate level logic), or other suitable means.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

Figure 1:
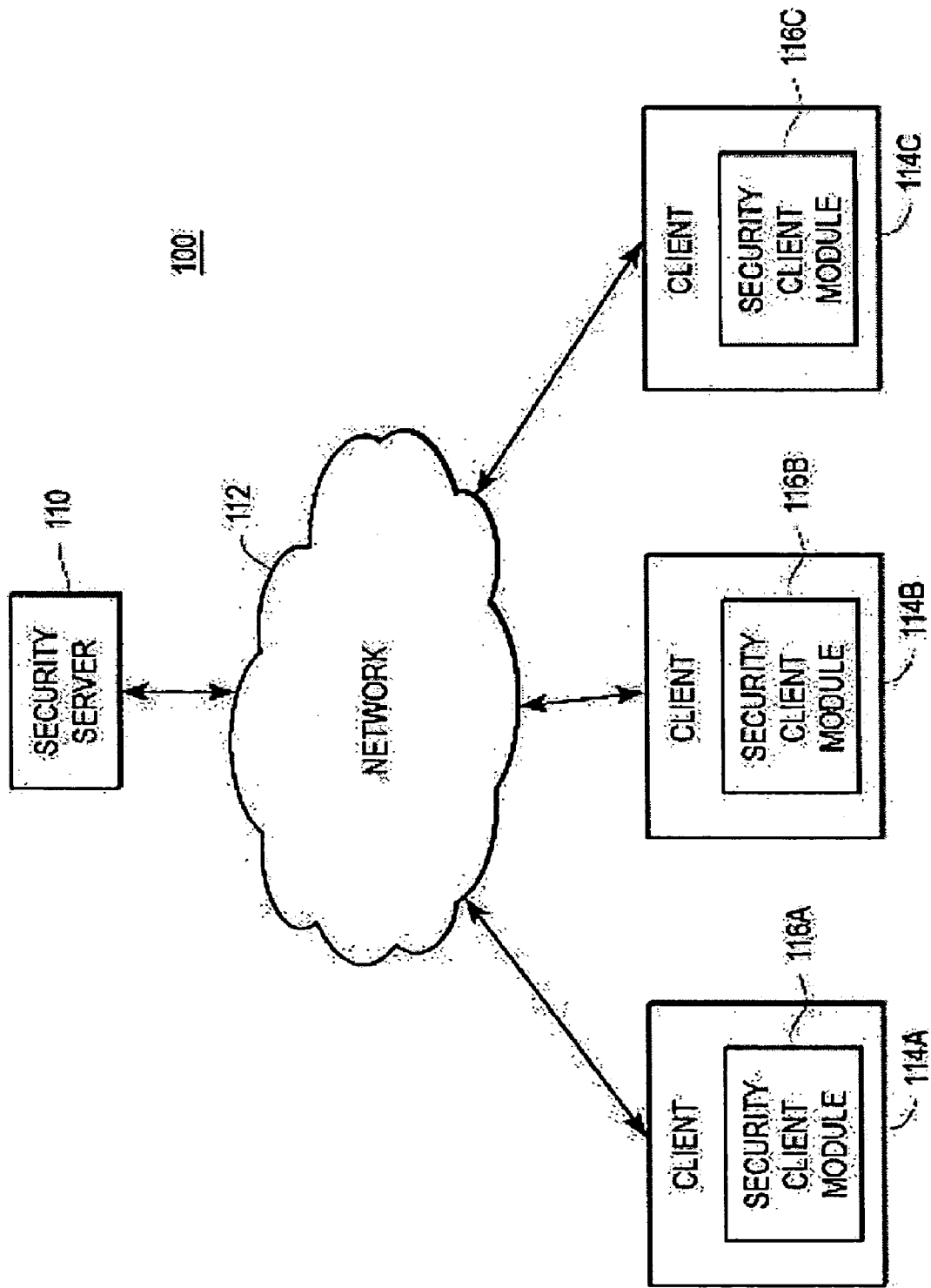
FIG. 1 is a block diagram of a computing environment configured in accordance with an embodiment of the present invention.

Note that the figures use like reference numerals to identify like elements. A letter after a reference numeral, such as "114A," indicates that the text refers specifically to the element having that particular reference numeral. A reference numeral in the text without a following letter, such as "114," refers to any or all of the elements in the figures bearing that reference numeral (e.g. "114" in the text refers to reference numerals "114A," "114B," and/or "114C" in the figures).

DETAILED DESCRIPTION OF THE INVENTION

Techniques are disclosed for detecting manipulations of user-kernel transition registers (such as the SYSENTER/SYSCALL critical registers of Intel/AMD processors, respectively), and other such critical registers. This way, a class of malicious rootkit and exploits are quickly detected. The techniques can be used in real-time and in any number of behavior blocking, antivirus, and/or intrusion prevention applications.

General Overview

As previously explained, the release of high performance processors such as the Intel's Pentium and AMD's K families has enabled modern operating systems to take advantage of performance gains using the corresponding SYSENTER/SYSEXIT and SYSCALL/SYSRET instruction sets, respectively. However, the mechanism that enables this gain is vulnerable to hijacking.

In more detail, the intended use for RDMSR and WRMSR instructions (e.g., Intel processor nomenclature) is to provide access to model-specific registers. In one possible scenario of malicious behavior, an attacker can use the RDMSR instruction to read the content of the SYSTENTER_EIP register (which is a critical user-kernel transition register in the Pentium processor architecture), store it for later use, and use the WRMSR instruction to replace the register's content with an arbitrary function address. This new function address typically points to the attacker's hook routine to execute code of the attacker's choice. This hook procedure is undetectable by current defense programs and information forensics applications that are watching for changes of API code (e.g., such as jump instruction insertion) or system call table manipulations (e.g., such as INT 2E hooks).

Although the above scenario refers to nomenclature associated with Intel processors, other processors have similar vulnerabilities, and the present invention is not intended to be limited to any particular processor architecture. Rather, the techniques described herein can be employed in protecting any systems having processor architectures that employ critical user-kernel transition registers that can be surreptitiously manipulated by malicious operations. Further note that the techniques described herein can be used with any number of operating systems, such as Microsoft Windows, Linux, Macintosh OS, Solaris, PalmOS, etc.

An embodiment of the present invention is able to reveal such surreptitious manipulations in real-time. Therefore, malicious or otherwise undesirable operations can be revealed to the user.

System Architecture

FIG. 1 is a block diagram of a computing environment configured in accordance with an embodiment of the present invention. As can be seen, the computing environment 100 includes a security server 110 connected to a network 112. The network 112 is also connected to multiple client computers 114, each of which includes a security client module 116.

The network 112 may be any type of communications network, such as a local area network (e.g., intranet), wide area network (e.g., Internet), or some combination thereof. Alternatively, the network 112 may be a direct connection between a client computer 114 and the security server 110. In general, the client computers 114, network 112, and/or the security server 110 may be in communication via any type of wired or wireless connection, using a wide variety of communication protocols (e.g., TCP/IP, HTTP, SMTP, FTP), encodings or formats (e.g., HTML, XML), and protection schemes (e.g., VPN, secure HTTP, SSL). Alternatively, the security server 110 may indirectly communicate with the client computer 114 via U.S. mail or other such delivery service, where a processor readable medium (e.g., compact disk or floppy disk) is sent to the address where one of the clients 114 is located. This processor readable medium can be encoded with instructions and/or data files that can be loaded, executed and/or otherwise used by the client 114.

The security server 110 is provided by a security software vender or other entity. The security server 110 can include one or more standard computer systems configured to communicate with client computers 114 via the network 112. For example, the security server 110 can include a web server, FTP server, or other technology that enables the security server 110 to interact with the client computers 114 via the network 112. In one embodiment, the security server 110 provides signatures and code to the client computers 114, for detecting malicious software including those that manipulate critical user-kernel transition registers (e.g., SYSENTER/SYSCALL/SYSEXIT/SYSRET registers). In addition, the security server 110 can provide signatures of exclusions, which are programs, routines, applications, etc that are known to legitimately manipulate critical user-kernel transition registers.

The client computer 114 is an electronic device that can host rootkit applications and exploits and other forms of malicious software. In one embodiment, the client computer 114 is a conventional computer system executing, for example, a Microsoft Windows-compatible operating system (OS), Apple OS X, and/or a Linux distribution. In another embodiment, the client computer 114 is another device having computer functionality, such as a personal digital assistant (PDA), cellular telephone, video game system, etc. Such client computers 114 typically store numerous computer files that can host malicious software, and has a processor with vulnerable critical user-kernel transition registers (e.g., SYSENTER/SYSCALL/SYSEXIT/SYSRET registers) as previously explained. Although only three client computers 114 are shown, note that some embodiments of the present invention have only one, while other embodiment may have thousands or millions of such clients.

Malicious software, sometimes called "malware," is generally defined as software that executes on the client computer 114 surreptitiously or that has some surreptitious functionality. Malicious software can take many forms, such as parasitic viruses that attach to legitimate files, worms that exploit weaknesses in the computer's security in order to infect the computer and spread to other computers, Trojan horse programs that appear legitimate but actually contain hidden malicious code, and spyware that monitors keystrokes and/or other actions on the computer in order to capture sensitive information or display advertisements. The executable file that hosts the malicious software can be modified with one or more packers in order to make the malicious software difficult to detect.

A rootkit is one type of Trojan horse, and is a collection of tools that allows an attacker to provide a backdoor into the client system. One such back door is achieved by manipulating the SYSENTER/SYSCALL critical registers (or other critical user-kernel transition registers) as previously explained. Once the attacker's new function address is loaded into the SYSTENTER_EIP register (or similar register), the attacker's hook routine can then execute malicious code (e.g., worms, data collectors, etc). Using conventional virus protection techniques, this hook procedure would likely go undetected until the attacker's executed code manifested symptoms to the user of the client computer 114. Note, however, that some malicious code may never manifest to the user, such as data collectors and other stealth-based spyware.

The client computer 114 executes a security client module 116 for detecting the presence of malicious software. The security module 116 can be, for example, incorporated into the OS of the computer or part of a separate comprehensive security package. In one embodiment, the security client module 116 is provided by the entity that operates the security server 110. The security client module 116 can communicate with the security server 110 via the network 112 in order to download the exclusions, signatures and/or other information utilized to detect malicious software. In an embodiment described here, the security client module 116 can detect malicious software that manipulates the SYSENTER/SYSCALL critical registers.

Figure 2:
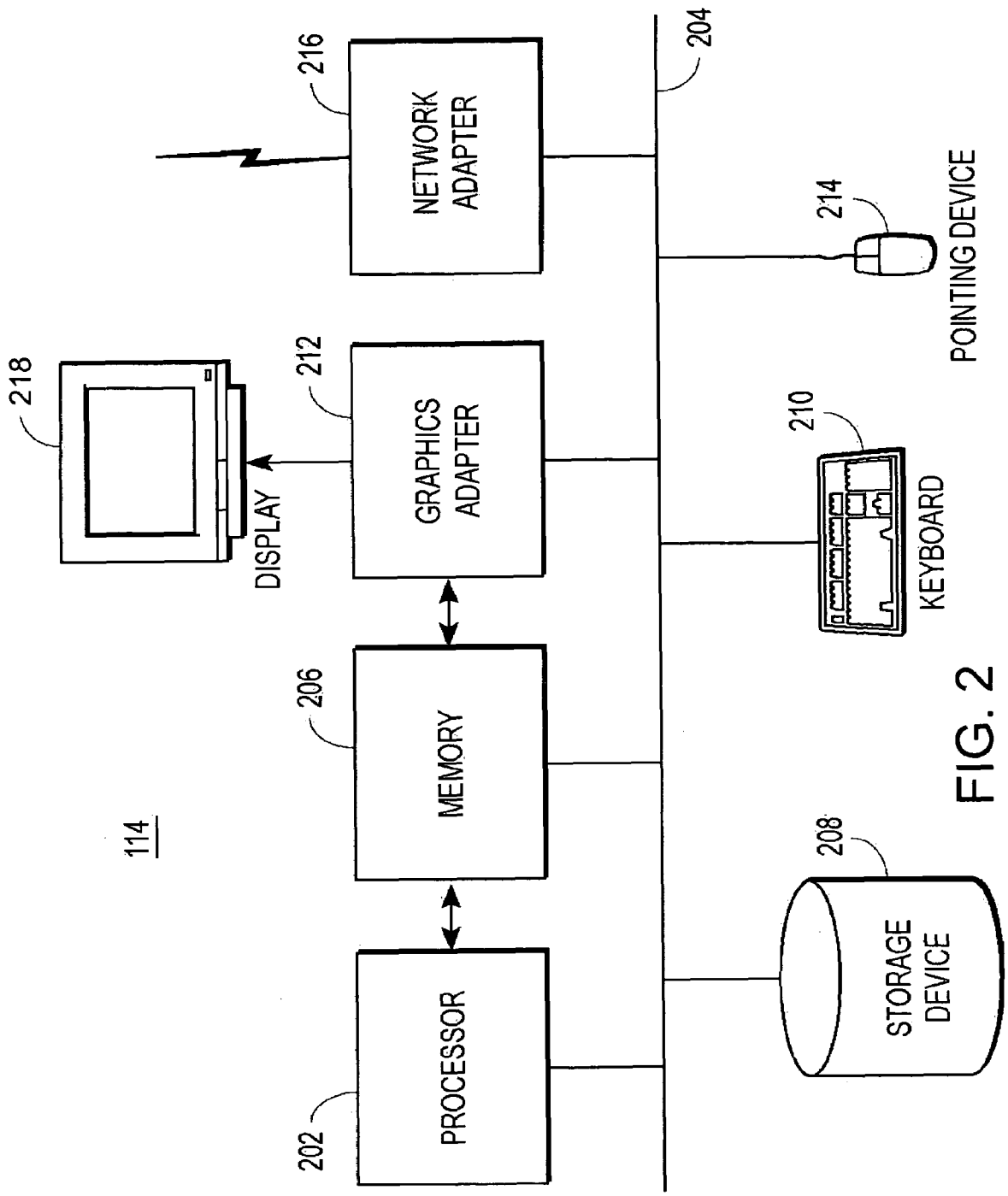
FIG. 2 is a block diagram illustrating a functional view of a client computer configured in accordance with an embodiment of the present invention.

FIG. 2 is a block diagram illustrating a functional view of a client computer 114 configured in accordance with an embodiment of the present invention. As can be seen, the client computer 114 includes a processor 202 operatively coupled via a bus 204 to a memory 206, a storage device 208, a keyboard 210, a graphics adapter 212, a pointing device 214, and a network adapter 216. A display 218 is operatively coupled to the graphics adapter 212.

The processor 202 may be any CPU or other processor that is vulnerable to having its registers surreptitiously manipulated or otherwise hijacked by malicious operations. In one particular embodiment, processor 202 includes user-kernel transition registers and enables the operating system executing thereon to use any one or combination of the SYSENTER/SYSCALL/SYSEXIT/SYSRET instruction sets, such as Intel Corporation's Pentium II and AMD's K7 processors (as well as subsequent such architectures, Pentium III, IV, etc and K8, K9, etc). Other processor architectures that can implement processor 202 will be apparent in light of this disclosure. In addition, the present invention is not intended to be limited to detecting manipulation of one type of register, such as user-kernel transition registers. Rather, the principles of the present invention can be used to detect manipulations and hijacking of any control, pointer, or general purpose registers used by processor 202.

The memory 206 may be, for example, firmware ROM, RAM, and/or flash memory, and holds instructions and data used by the processor 202. The pointing device 214 may be a mouse, track ball, or other type of pointing device, and is used in combination with the keyboard 210 to input data into the computer 114, as is typically done. The graphics adapter 212 displays images and other information on the display 218. The network adapter 216 communicatively couples the computer 114 with the network 112.

The storage device 208 is a hard disk drive in one embodiment, but can also be any other device capable of storing data, such as a writeable compact disk or DVD, and/or a solid-state memory device. The storage device 208 can hold multiple files containing executable code and/or data, as is typically done. The computer 114 can load an executable file into memory 206 and execute it using the processor 202. An executable file that is loaded into memory 206 for execution is referred to as a "process." The file on the storage device 208 from which the process was loaded is said to "host" the process.

The files stored on the storage device 208 can be, for example, in the Microsoft Windows Portable Executable (PE) format. Typically, a PE file is of type .EXE, indicating that the file is an executable file, or .DLL, indicating that the file is a dynamic link library (DLL) that can be executed by other files. The PE file header holds a data structure containing fields that provide basic information about the file. One such field is BaseOfImage, which describes the preferred base address in the address space of the process to which the OS should map the executable file image. Another field is SizeOfImage, which indicates the amount of memory in the process's address space to reserve for the loaded executable image. Other file formats, such as those utilized by Apple Macintosh and Linux-based computers usually contain similar information.

The computer 114 is adapted to execute computer program modules for providing protective functionality described herein, including detecting malicious manipulations of the SYSENTER/SYSCALL critical registers, or similar registers or control facilities. In this particular example, the term "module" refers to computer program logic for providing the specified functionality. Note, however, that other modules configured in accordance with the principles of the present invention can be implemented in hardware, firmware, software, or some combination thereof. It will be understood in light of this disclosure that the modules described herein represent one embodiment of the present invention. Certain embodiments may include other and/or different modules and functionality. In addition, the embodiments may lack modules described herein and/or distribute the described functionality among the modules in a different manner. In one embodiment, the modules are stored on the storage device 208 as executable files, loaded into the memory 206, and executed by the processor 202 as one or more processes.

Security Module

Figure 3:
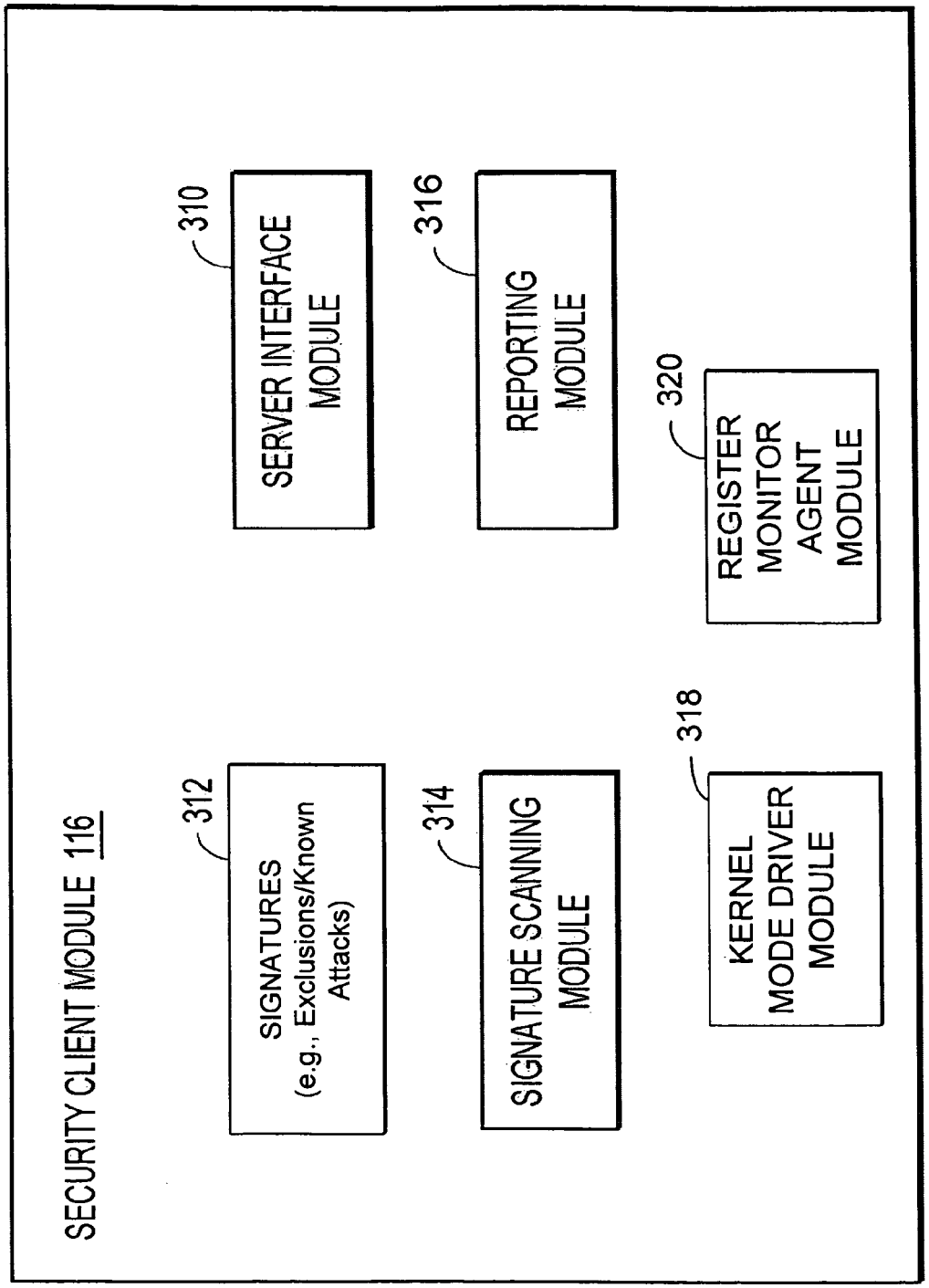
FIG. 3 is a block diagram illustrating modules within a security client module configured in accordance with an embodiment of the present invention.

FIG. 3 is a block diagram illustrating modules within the security client module 116 according to one embodiment of the present invention. As can be seen, the module 116 includes server interface module 310, signature database 312, a signature scanning module 314, a reporting module 316, a kernel mode driver module 318, and a register monitor agent module 320. As previously explained, each of these components can be implemented in software that executes on a processor of a client computer. However, other embodiments could be implemented, for example, in hardware (such as in gate level logic), or in a combination of software and gate level logic. Numerous configurations will be apparent in light of this disclosure.

The server interface module 310 enables communication between the security client module 116 and the security server 110 via the network 112. It may also be programmed or otherwise configured to send and receive information from processes on the local machine 114, or from other devices on the network 112. In one embodiment, the server interface module 310 retrieves signatures of known malicious software and exclusions from the server 110 and provides host files to the server 110. Once module 310 receives the signatures and exclusions from server 110, it updates the signature database 312 accordingly.

The signatures database 312 stores signatures of exclusions. As previously explained, exclusions are trusted programs, routines, applications, etc that are known to legitimately manipulate critical user-kernel transition registers, or other registers, in a manner similar to register manipulation performed by malware. Thus, if a register manipulation is detected, then the security client module 116 can be configured to determine if that manipulation was caused by a legitimate source. If not, then the appropriate action can be taken, as will be explained in turn. The signatures database 312 can also be configured to store signatures for identifying known malicious software on the client computer 114, including malware known for improper manipulation of registers as explained herein. In one embodiment, the signatures in the signatures database 312 contain strings, instruction usage records and/or other data that can be used to uniquely identify specific types of malicious software (or trusted software, for purposes of exclusion from security processing). For example, a signature can contain a specific sequence of values that are found in only a particular virus. If a file on the storage device 208 of the client computer 114 has the sequence of values, then that file is infected with the virus. The signatures are designed to be utilized with executable files, such as those in the WINDOWS PE format, and with other types and formats of files that might contain malicious software.

The signature scanning module 314 scans any programs requesting a hook via register manipulation as described herein, as well as files on the storage device 208 or in memory 206 for the presence of the signatures in the signatures database 312. In one embodiment, the signature scanning module 314 analyzes a file to identify its potential entry points and other locations likely to contain malicious software. The module 314 scans these likely locations to determine whether they contain a signature from the signatures database 312. In one embodiment, the signature scanning module 314 performs additional analysis of the file, such as emulating instructions of the file within a virtual machine and then scanning the memory of the virtual machine for matching signatures.

The reporting module 316 can be used to provide a user interface that informs the user of intrusions and security actions taken. Note, however, that no reporting is necessary, in that malicious program requests and other activity could be silently denied or otherwise resolved. In addition, module 316 can also be configured to collect information about newly detected threats and submit them to an analysis agent, such as a remote security response center (e.g., via the server interface module 310 and network 112). The collected information could include, for example, the functional profile of the threat (e.g., what it did to the client computer and how) and/or samples of suspect code related to the hook routine.

The kernel mode driver module 318 is programmed or otherwise configured to initialize the detection scheme described herein at boot-up of the client computer 114 (or other protected system). In one such embodiment, initialization performed by the kernel mode driver module 318 includes reading the current value of the target user-kernel transition register (e.g., SYSENTER_EIP register of the Intel Pentium processor architectures), and verifying that the target register points to an acceptable location (e.g., by comparing the signature of the current hook routine pointed to by the register to signatures of trusted programs). Assuming the current hook routine is legitimate, initialization further includes changing the content of the target register to point to a detection agent, as will be explained in turn. Initialization may further include other functionality, such as CPU identification (as required), so that implementation details unique to a particular processor architecture can be configured. The protection techniques described herein can generally be applied to any one of a number of processor architectures (e.g., AMD, Analog Devices, HP, IBM, Intel, Siemens, and Zilog, to name a few).

The register monitor agent module 320 is called whenever the CPU (e.g., processor 202) of the protected computer system executes a SYSCALL/SYSENTER instruction, assuming a the CPU is an Intel/AMD processor (e.g., Pentium IV or K7 processor). Other processors will have similar instructions that can be used to trigger calling of the register monitor agent module 320, as will be apparent in light of this disclosure.

In any case, once the register monitor agent module 320 is called, it is programmed or otherwise configured to verify that the current address stored in the target user-kernel transition register (e.g., such as the SYSENTER_EIP register) remains pointed to the register monitor agent module 320 itself. This monitoring is continuous, thereby providing real-time detection capability. If a change to the target register is detected, then the register monitor agent module 320 is further configured to determine if an exclusion applies to the code to which the register points. If so, then the register monitor agent module 320 is further configured to change the content of the target register to point back to the register monitor agent module 320, and the monitoring continues.

However, if no exclusion applies to the detected register manipulation and/or hook routine, then the register monitor agent module 320 can be configured to signal that the system has been compromised (e.g., via a user interface provided by the reporting module 316). The register monitor agent module 320 can also be configured to take corrective action. For example, upon detection of a unknown hook routine, the register monitor agent module 320 can be configured to remove the hook routine to which the target register is pointing, and/or to clear the register of the hook routine pointer so that the hook routine cannot be called or otherwise activated.

Note that the register monitor agent module 320 can optionally be integrated into the kernel mode driver module 318, if so desired. The modules are shown in FIG. 3 as being distinct from one another for the purpose of illustration. Other configurations and variations will be apparent in light of this disclosure.

Methodology

Figure 4:
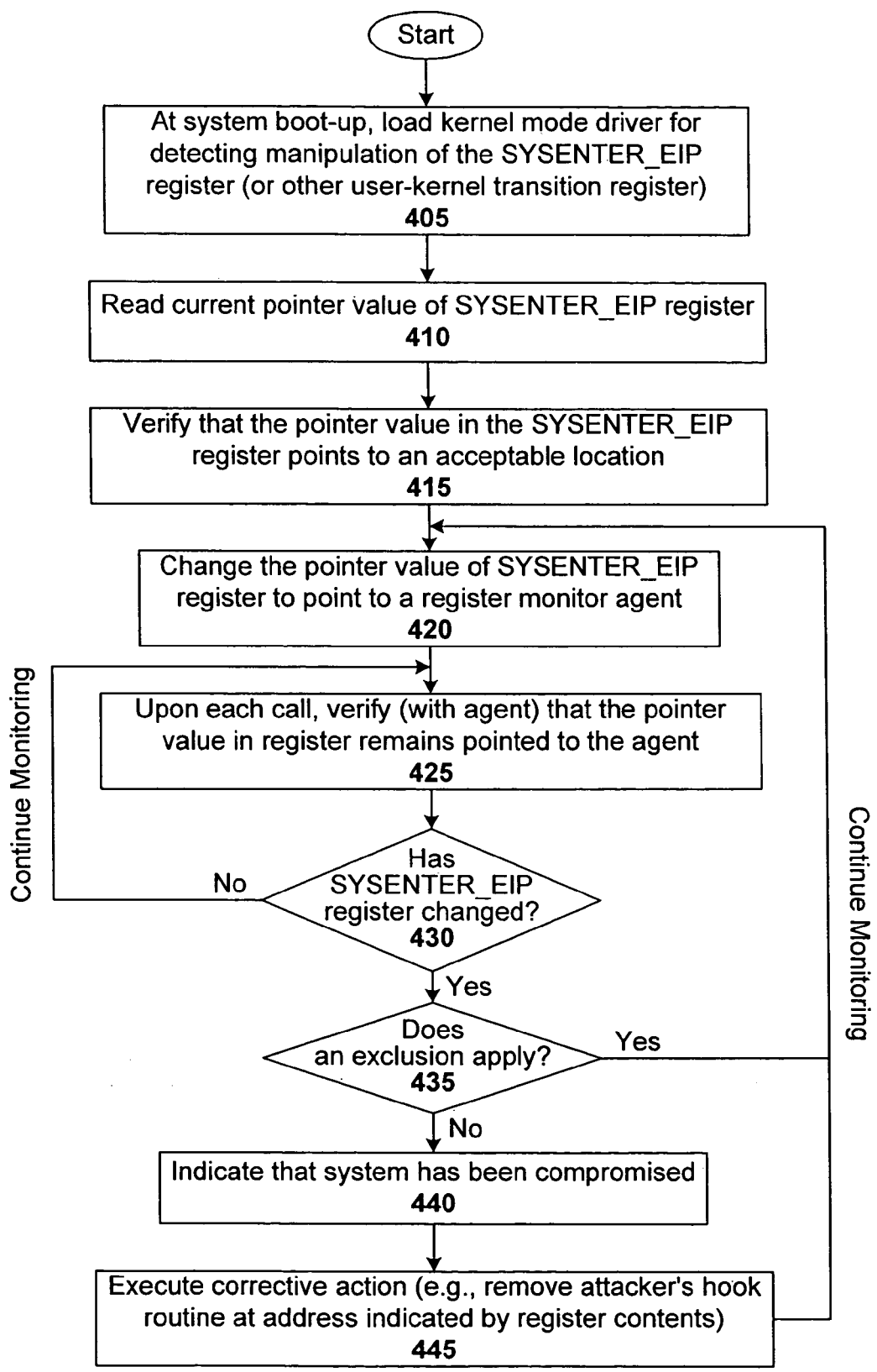
FIG. 4 illustrates a method for detecting potentially malicious or otherwise undesirable actions in accordance with an embodiment of the present invention.

FIG. 4 illustrates a method for detecting potentially malicious or otherwise undesirable actions in accordance with an embodiment of the present invention. This method can be carried out, for example, by the kernel mode driver module 318 and the register monitor agent module 320 as described with reference to FIG. 3. As previously explained, these modules can be implemented as executable code encoded on a machine-readable medium.

At system boot-up, the method begins with loading 405 the kernel mode driver for detecting manipulation of a user-kernel transition register (e.g., SYSENTER_EIP register). The method continues with reading 410 the current pointer value of the user-kernel transition register, and verifying 415 that the pointer value points to an acceptable location. This verification can be carried out, for instance, by comparing known good code signatures to the signature of the code pointed to by the pointer value in the register. Also, the pointer value in the register may be known to be the address of a trusted application or other code. Note that if the pointer value is not pointing to an acceptable value at boot-up, the method may also include indicating that the system has been compromised.

Once the register contents are verified as legitimate, the method continues with changing 420 the pointer value of the user-kernel transition register to point to a register monitor agent that will monitor the register for manipulation. This change effectively enables a friendly hook routine (in this case, the register monitor agent), right at boot-up time. As previously explained, the register monitor agent is called whenever the host system CPU executes a SYSCALL/SYSENTER or equivalent instruction. Upon each such call, the method continues with verifying 425 that the pointer value in the user-kernel transition register remains pointed to the register monitor agent itself (so that monitoring can continue).

The method continues with determining 430 if the pointer value of the user-kernel transition register has changed. If not, then the method continues with monitoring the user-kernel transition register, by repeating steps 425 and 430. If, on the other hand, the content of the user-kernel transition register has changed, then the method continues with determining 435 if an exclusion applies. This determination will indicate whether the detected manipulation of the register was caused by a trusted source, and can be carried out, for example, in a similar fashion to the verification performed at step 415 (e.g., by comparing known good signatures and/or address locations to the signature and/or address location of the hook routine.

If an exclusion does apply, then the method continues the monitoring process, by repeating steps 420, 425, 430, and 435. However, if an exclusion does not apply, then the method continues with indicating 440 that the system has been compromised. This indication may include, for example, sending a message to user regarding the intrusion, and/or notifying an analysis module (e.g., local) or security response center (e.g., remote) of the intrusion.

The method continues with executing 445 corrective action, which in this example embodiment includes changing the pointer value of the user-kernel transition register to point back to the register monitor agent so that register monitoring can continue, and to prevent the attacker from accessing the hook routine. Other corrective actions can be performed here as well. For instance, an analysis module (e.g., local) or security response center (e.g., remote) can scan the infected computer system and report on the system's current state to learn more about the intrusion. The corrective action may also include removing the attacker's hook routine at the address indicated by register contents, and/or transmitting a section of code including the suspect hook routine to a security response center for analysis.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for detecting malicious or otherwise undesirable register manipulation in a computing system, the method comprising:

changing a pointer value in a user-kernel transition register to point to a register monitor agent that will monitor the user-kernel transition register for manipulation;

verifying that the pointer value in the user-kernel transition register remains pointed to the register monitor agent;

in response to determining that the pointer value in the user-kernel transition register has changed, determining if an exclusion applies because manipulation of the register was caused by a trusted source; and in response to determining an exclusion does not apply, indicating that the computing system has been compromised and executing corrective action comprising changing the pointer value in the user-kernel transition register to point to the register monitor agent.

2. The method of claim 1 wherein at boot-up of the computing system, the method includes loading a kernel mode driver for initializing the computing system to carry out the method.

3. The method of claim 2 wherein initializing the computing system includes:

reading a current pointer value of the user-kernel transition register; and verifying that the pointer value points to an acceptable location.

4. The method of claim 3 wherein in response to the user-kernel transition register not pointing to an acceptable location at boot-up, indicating that the computing system has been compromised.

5. The method of claim 1 wherein in response to determining an exclusion does apply, repeating the changing, verifying, and determining.

6. The method of claim 1 wherein executing corrective action includes at least one of scanning the computing system, reporting a current state of the computing system, removing non-excluded code, and transmitting non-excluded code for analysis.

7. A machine-readable medium encoded with instructions, that when executed by a processor, cause the processor to carry out a process for detecting malicious or otherwise undesirable register manipulation in a computing system, the process comprising:

changing a pointer value in a user-kernel transition register to point to a register monitor agent that will monitor the user-kernel transition register for manipulation;

verifying that the pointer value in the user-kernel transition register remains pointed to the register monitor agent;

in response to determining that the pointer value in the user-kernel transition register has changed, determining if an exclusion applies because manipulation of the register was caused by a trusted source;

in response to determining an exclusion does not apply, indicating that the computing system has been compromised and executing corrective action comprising changing the pointer value in the user-kernel transition register to point to the register monitor agent.

8. The machine-readable medium of claim 7 wherein at boot-up of the computing system, the process includes loading a kernel mode driver for initializing the computing system to carry out the process, the initializing including:

reading a current pointer value of the user-kernel transition register; and verifying that the pointer value points to an acceptable location.

9. The machine-readable medium of claim 7 wherein in response to determining an exclusion does apply, the process includes repeating the changing, verifying, and determining.

10. An apparatus for detecting malicious or otherwise undesirable register manipulation in a computing system, the apparatus comprising:

a machine-readable medium encoded with instructions, the instructions comprising:

a register monitor agent module for verifying that a pointer value in a user-kernel transition register remains pointed to the register monitor agent, and in response to determining that the pointer value has changed, for determining if an exclusion applies because manipulation of the register was caused by a trusted source, and in response to determining an exclusion does not apply, for indicating that the computing system has been compromised and for executing corrective action comprising changing the pointer value in the user-kernel transition register to point back to the register monitor agent; and a kernel mode driver module that loads at boot-up of the computing system, for changing the pointer value in the user-kernel transition register to point to the register monitor agent.

11. The apparatus of claim 10 wherein the register monitor agent is called whenever a processor of the computing system executes a SYSENTELR/SYSCALL/SYSEXIT/SYSRET instruction.

12. The apparatus of claim 10 wherein prior to changing the pointer value in the user-kernel transition register to point to the register monitor agent, the kernel mode driver module is further configured for initializing the apparatus, including reading a current pointer value of the user-kernel transition register, verifying that the pointer value points to an acceptable location, and in response to the user-kernel transition register not pointing to an acceptable location at boot-up, indicating that the computing system has been compromised.

13. The apparatus of claim 10 wherein in response to determining an exclusion does apply, the register monitor agent module is configured for changing the pointer value in the user-kernel transition register to point back to the register monitor agent and to continue monitoring the user-kernel transition register.

14. The apparatus of claim 10 wherein the register monitor agent module is integrated into the kernel mode driver module.

15. An apparatus for detecting malicious or otherwise undesirable register manipulation in a computing system, the apparatus comprising:

a register monitor agent means for verifying that a pointer value in a user-kernel transition register remains pointed to the register monitor agent means, and in response to determining that the pointer value has changed, for determining if an exclusion applies because manipulation of the register was caused by a trusted source, and in response to determining an exclusion does not apply, for indicating that the computing system has been compromised and for executing corrective action comprising changing the pointer value in the user-kernel transition register to point back to the register monitor agent;

a kernel mode driver means that activates at boot-up of the computing system, for changing the pointer value in the user-kernel transition register to point to the register monitor agent means; and a computer processor for executing the register monitor agent means and the kernel mode driver means.

\* \* \* \* \*